US011997398B2

(12) United States Patent
Hirasawa et al.

(10) Patent No.: US 11,997,398 B2
(45) Date of Patent: May 28, 2024

(54) IMAGING APPARATUS, IMAGE PROCESSING APPARATUS, AND IMAGE PROCESSING METHOD (71) Applicant: SONY GROUP CORPORATION, Tokyo (JP)

(72) Inventors: Yasutaka Hirasawa, Tokyo (JP); Yuhi Kondo, Tokyo (JP); Legong Sun, Tokyo (JP); Taishi Ono, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 238 days.

(21) Appl. No.: 17/602,588

(22) PCT Filed: Feb. 7, 2020

(86) PCT No.: PCT/JP2020/004824
§ 371 (c)(1),
(2) Date: Oct. 8, 2021

(87) PCT Pub. No.: WO2020/213238
PCT Pub. Date: Oct. 22, 2020

(65) Prior Publication Data
US 2022/0210322 A1 Jun. 30, 2022

(30) Foreign Application Priority Data
Apr. 19, 2019 (JP) ................. 2019-079979

(51) Int. Cl.
H04N 23/951 (2023.01)
G06T 1/00 (2006.01)
G06T 5/50 (2006.01)

(52) U.S. Cl.
CPC ......... H04N 23/951 (2023.01); G06T 1/0007 (2013.01); G06T 5/50 (2013.01); G06T 2207/10024 (2013.01)

(58) Field of Classification Search
CPC ...... H04N 23/951; H04N 23/55; H04N 23/81; H04N 17/002; G06T 1/0007; G06T 5/50; G06T 2207/10024
See application file for complete search history.

(56) References Cited

U.S. PATENT DOCUMENTS 11,108,951 B2 * 8/2021 Kurita ................... H04N 23/60
2015/0022691 A1 1/2015 Matsunaga
(Continued)

FOREIGN PATENT DOCUMENTS

CN 107251553 A 10/2017
CN 107533370 A 1/2018
(Continued)

OTHER PUBLICATIONS

Extended European Search Report of EP Application No. 20791081.8, dated Apr. 4, 2022, 47 pages.
(Continued)

Primary Examiner — Kelly L Jerabek
(74) Attorney, Agent, or Firm — CHIP LAW GROUP (57) ABSTRACT An imaging apparatus (10) includes an imaging unit (11) that has a first pixel block and a second pixel block provided in a pixel region, the first pixel block including polarization pixels with two different polarization directions and a non-polarization pixel, the second pixel block including polarization pixels with a plurality of polarization directions including a different polarization direction from the first pixel block. An image processing apparatus (20) acquires a captured image generated by the imaging apparatus (10), and a correction coefficient calculation unit (40) calculates a correction coefficient that absorbs a sensitivity difference between polarization pixels and non-polarization pixels, on the basis of an image of the second pixel block. A polarization information generation unit (50) generates polarization information indicating the polarization characteristics of the (Continued)

object included in the captured image, using a non-polarization image and polarization component images generated by a demosaicing unit (30) and the correction coefficient calculated by the correction coefficient calculation unit (40). The correction coefficient of the sensitivity difference between the polarization pixels and the non-polarization pixels can be acquired without any calibration.

13 Claims, 10 Drawing Sheets

(56) References Cited

U.S. PATENT DOCUMENTS

| | | | |
|---|---|---|---|
| 2015/0235375 A1 | 8/2015 | Imagawa | |
| 2018/0013988 A1* | 1/2018 | Kondo | H04N 25/134 |
| 2018/0302597 A1* | 10/2018 | Honda | H01L 27/14627 |
| 2019/0170586 A1 | 6/2019 | Mitani et al. | |
| 2019/0260974 A1 | 8/2019 | Kaizu et al. | |

FOREIGN PATENT DOCUMENTS

| | | |
|---|---|---|
| CN | 109565546 A | 4/2019 |
| CN | 109565550 A | 4/2019 |
| CN | 109804621 A | 5/2019 |
| EP | 2040477 A1 | 3/2009 |
| EP | 3255886 A2 | 12/2017 |
| JP | 2009042040 A | 2/2009 |
| JP | 2009-290895 A | 12/2009 |
| JP | 2013-057769 A | 3/2013 |
| JP | 2016022010 A | 2/2016 |
| JP | 2018-029280 A | 2/2018 |
| WO | WO-2017002715 A1 | 1/2017 |
| WO | 2018/074064 A1 | 4/2018 |
| WO | 2018/230119 A1 | 4/2020 |

OTHER PUBLICATIONS

International Search Report and Written Opinion of PCT Application No. PCT/JP2020/004824, dated Apr. 14, 2020, 09 pages of ISRWO.

* cited by examiner

⊠ : SENSITIVITY DIFFERENCE DETECTION PIXEL BLOCK

FIG. 5B

ARd

FIG. 5C

PSc

IMAGING APPARATUS, IMAGE PROCESSING APPARATUS, AND IMAGE PROCESSING METHOD

CROSS REFERENCE TO RELATED APPLICATIONS

This application is a U.S. National Phase of International Patent Application No. PCT/JP2020/004824 filed on Feb. 7, 2020, which claims priority benefit of Japanese Patent Application No. JP 2019-079979 filed in the Japan Patent Office on Apr. 19, 2019. Each of the above-referenced applications is hereby incorporated herein by reference in its entirety.

TECHNICAL FIELD

This technology relates to an imaging apparatus, an image processing apparatus, and an image processing method, and enables acquisition of a correction coefficient of a sensitivity difference between a polarization pixel and a non-polarization pixel without any calibration.

BACKGROUND ART

There are disclosed methods for acquiring a polarization image, using an imaging unit and a polarization filter. For example, Patent Document 1 discloses a method for acquiring polarization images with a plurality of polarization directions by disposing a patterned polarizer in front of an imaging unit. Also, Patent Document 2 discloses acquiring accurate polarization information on the basis of a non-polarization image and a polarization image by providing non-polarization pixels that do not include any polarizer, because a problem such as an increase in noise or the like is caused by a decrease in the quantity of light entering the imaging unit due to the existence of a polarizer.

CITATION LIST

Patent Document

Patent Document 1: Japanese Patent Application Laid-Open No. 2009-290895
Patent Document 2: WO 2018/074064 A

SUMMARY OF THE INVENTION

Problems to be Solved by the Invention

However, to accurately acquire polarization information on the basis of a non-polarization image and a polarization image, calibration needs to be performed beforehand so that a sensitivity difference between a non-polarization pixel not having any polarizer and a polarization pixel having a polarizer can be measured.

Therefore, this technology aims to provide an imaging apparatus, an image processing apparatus, and an image processing method capable of acquiring a correction coefficient of a sensitivity difference between a polarization pixel and a non-polarization pixel without any calibration.

Solutions to Problems

A first aspect of this technology is an imaging apparatus that includes an imaging unit that has a first pixel block and a second pixel block provided in a pixel region, the first pixel block including polarization pixels with two different polarization directions and a non-polarization pixel, the second pixel block including polarization pixels with a plurality of polarization directions including a different polarization direction from the first pixel block.

In this technology, the first pixel block and the second pixel block are provided in the pixel region of the imaging unit. The first pixel block includes polarization pixels with two different polarization directions and a non-polarization pixel. Meanwhile, the second pixel block includes polarization pixels with a plurality of polarization directions including a different polarization direction from the first pixel block, such as polarization pixels with three different polarization directions or polarization pixels with polarization directions orthogonal to one another, for example, and a non-polarization pixel.

The second pixel blocks are smaller in number than the first pixel blocks, and are provided in a different region from the polarization information generation target region, or in a radial direction from the position corresponding to the optical axis position of the imaging lens, or at predetermined intervals, for example.

A second aspect of this technology is an image processing apparatus that includes a correction coefficient calculation unit that calculates a correction coefficient of a sensitivity difference between a non-polarization pixel and a polarization pixel, on the basis of polarization pixels with two or more different polarization directions and non-polarization pixels in a captured image including the polarization pixels with a plurality of polarization directions and the non-polarization pixels.

In this technology, the correction coefficient of a sensitivity difference between a polarization pixel and a non-polarization pixel is calculated by the correction coefficient calculation unit, on the basis of a captured image generated by an imaging unit that has a first pixel block and a second pixel block provided in the pixel region, the first pixel block including polarization pixels with two different polarization directions and a non-polarization pixel, the second pixel block including polarization pixels with a plurality of polarization directions including a different polarization direction from the first pixel block, for example. The second pixel block includes polarization pixels with three different polarization directions, for example, and the correction coefficient calculation unit calculates the correction coefficient on the basis of pixel values of the non-polarization pixel and the polarization pixels with the three different polarization directions. Alternatively, the second pixel block includes polarization pixels with polarization directions orthogonal to one another, and the correction coefficient calculation unit calculates the correction coefficient on the basis of pixel values of the non-polarization pixel and the polarization pixels with the polarization directions orthogonal to one another. Further, the correction coefficient calculation unit may calculate the correction coefficient again at a predetermined timing, such as a time when imaging lenses are replaced in the imaging apparatus that generates the captured image, for example.

The image processing apparatus may also include: a demosaicing unit that generates a non-polarization image and a polarization component image for each polarization direction from the captured image; and a polarization information generation unit that generates polarization information indicating the polarization characteristics of the object included in the captured image, on the basis of the polarization component image and the non-polarization image generated by the demosaicing unit, and the correction coefficient calculated by the correction coefficient calculation unit.

A third aspect of this technology is an image processing method that includes calculating, with a correction coefficient calculation unit, a correction coefficient of a sensitivity difference between a non-polarization pixel and a polarization pixel, on the basis of non-polarization pixels and polarization pixels with two or more different polarization directions in a captured image including the non-polarization pixels and the polarization pixels with a plurality of polarization directions.

MODE FOR CARRYING OUT THE INVENTION

The following is a description of modes for carrying out the present technology. Note that explanation will be made in the following order.

1. Polarization image
2. Embodiment
2-1. Imaging apparatus
2-2. Image processing apparatus
2-2-1. Configuration of an image processing apparatus
2-2-2. Operation of the image processing apparatus
3. Other Embodiments
4. Example applications

1. POLARIZATION IMAGE

Figure 1:
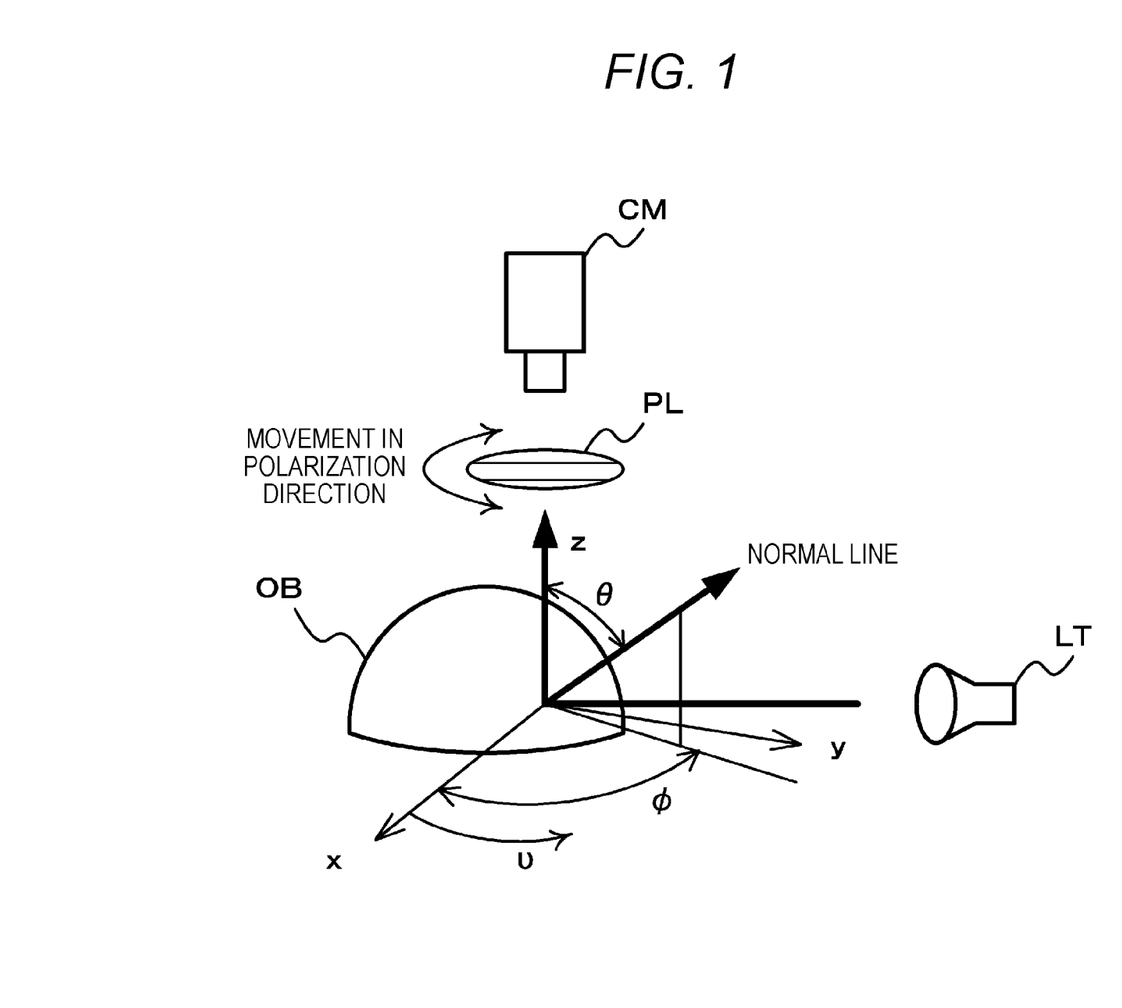
FIG. 1 is a diagram for explaining a relationship between an object and polarization images.
Figure 2:
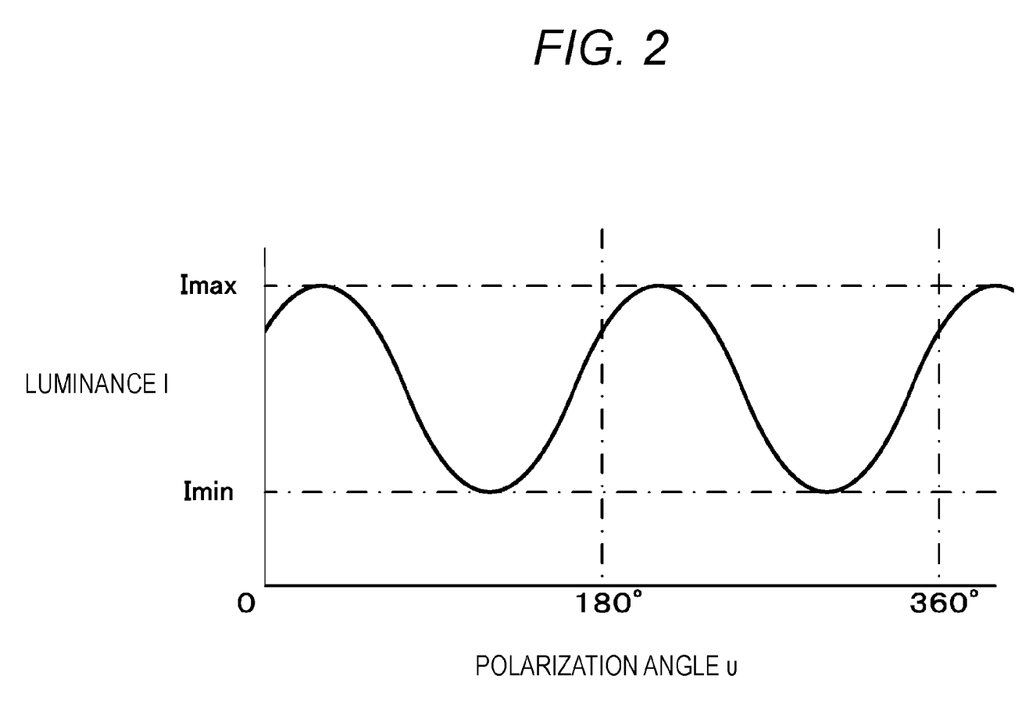
FIG. 2 is a graph showing change in luminance.

FIG. 1 is a diagram for explaining a relationship between an object and a polarization image. For example, an object OB is illuminated with a light source LT, and a camera CM captures images of the object OB via a polarizing plate PL. In the captured images in this case, the luminance of the object OB varies depending on the polarization direction of the polarizing plate PL. Note that, for ease of explanation, imaging is performed by rotating the polarizing plate PL so as to capture a plurality of polarization images, with the highest luminance being Imax, the lowest luminance being Imin, for example. Further, where the x-axis and the y-axis in the two-dimensional coordinates are in the plane of the polarizing plate PL, an angle in the y-axis direction with respect to the x-axis when the polarizing plate PL is rotated is defined as a polarization angle υ. When the polarizing plate PL is rotated 180 degrees, the polarizing plate PL returns to the original polarization state and has a cycle of 180 degrees, and the luminance I changes as shown in FIG. 2, for example.

Where the polarization angle when the maximum luminance Imax is observed is defined as the azimuth angle φ (the polarization phase of the observation light), the luminance I observed when the polarizing plate PL is rotated can be expressed by Equation (1).

[Mathematical Formula 1]

$$I = \frac{I_{max} + I_{min}}{2} + \frac{I_{max} - I_{min}}{2} \cos(2(v - \phi)) \quad (1)$$

Further, where the observation value I0 in a polarization direction θ=0°, the observation value I45 in a polarization direction θ=45°, the observation value I90 in a polarization direction θ=90°, and the observation value I135 in a polarization direction θ=135° are used, Equation (1) can be expressed as an equation using Stokes vectors S=[S0, S1, S2]$^{-T}$ shown in Equation (2). Note that, in Equation (2), the Stokes vector S0 is a value calculated using Equation (3), the Stokes vector S1 is a value calculated using Equation (4), and the Stokes vector S2 is a value calculated using Equation (5).

[Mathematical Formula 2]

$$I_\theta = S_2 \cdot \sin(2 \cdot \theta) + S_1 \cdot \cos(2 \cdot \theta) + S_0 \quad (2)$$

$$S_0 = \frac{I_0 + I_{90}}{2} \quad (3)$$

$$S_1 = \frac{I_0 - I_{90}}{2} \quad (4)$$

$$S_2 = \frac{I_{45} - I_{135}}{2} \quad (5)$$

The average value of the maximum luminance Imax and the minimum luminance Imin, and the Stokes vector S0 indicate light intensity, and a correction coefficient K that absorbs the sensitivity difference between a polarization pixel and a non-polarization pixel can be calculated on the basis of Equation (6) using the observation value In of the non-polarization pixel.

$$K = S0/In = (Imax - Imin)/(2 \cdot In) \quad (6)$$

Therefore, in the present technology, an imaging apparatus that generates an image signal of a captured image includes: a first pixel block (hereinafter referred to as a "polarization information generation pixel block") that includes polarization pixels with two different polarization directions and non-polarization pixels to generate polarization information; and a second pixel block (hereinafter referred to as a "sensitivity difference detection pixel block") that includes polarization pixels with a plurality of polarization directions including a different polarization direction from the polarization information generation pixel block so that a sensitivity difference can be detected. The correction coefficient K is calculated on the basis of the pixel values of the sensitivity difference detection pixel block, and the calculated correction coefficient K and the pixel values of the polarization information generation pixel block are used so that accurate polarization information can be acquired without any calibration. Further, to reduce the decrease in sensitivity, the number of polarization information generation pixel blocks is made smaller than the number of polarization information generation pixel blocks.

2. EMBODIMENT

<2-1. Imaging Apparatus>

Figure 3:
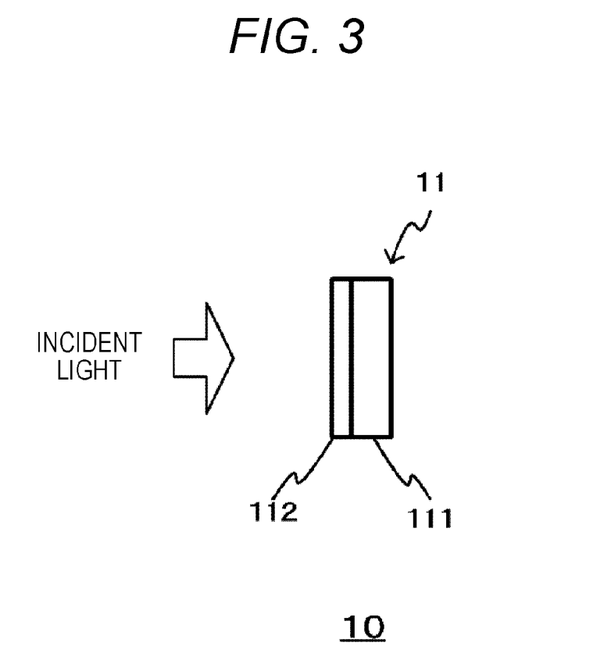
FIG. 3 is a diagram showing part of the configuration of an imaging apparatus.

FIG. 3 shows part of the configuration of an imaging apparatus. An imaging apparatus 10 includes an imaging unit 11 in which polarization information generation pixel blocks each including polarization pixels with two different polarization directions and non-polarization pixels, and sensitivity difference detection pixel blocks each including polarization pixels with a plurality of polarization directions including a different polarization direction from the polarization information generation pixel blocks are provided in the pixel region.

The imaging unit 11 has a configuration in which a polarization filter 112 is disposed on an incident face of an image sensor 111, and the polarization filter 112 is designed so that the polarization information generation pixel blocks and the sensitivity difference detection pixel blocks are provided in the pixel region. As the polarization filter 112, photonic liquid crystal, a wire grid, or the like is used.

A sensitivity difference detection pixel block includes polarization pixels with three different polarization directions or polarization pixels with polarization directions orthogonal to each other, and non-polarization pixels. As the sensitivity difference detection pixel blocks are designed in this manner, the function indicating the change in the luminance I shown in FIG. 2 can be obtained on the basis of the pixel values of the polarization pixels with the three different polarization directions. Thus, the correction coefficient can be calculated on the basis of Equation (6) described above. Alternatively, the pixel values of the polarization pixels with the orthogonal polarization directions are used, so that the correction coefficient can be calculated on the basis of Equation (6) described above.

Further, in a sensitivity difference detection pixel block, two polarization directions of the three different polarization directions and one polarization direction of the polarization directions orthogonal to one another may be polarization directions equal to the polarization direction of a polarization pixel in a polarization information generation pixel block. As the sensitivity difference detection pixel blocks are designed in this manner, the difference in configuration between the sensitivity difference detection pixel blocks and the polarization information generation pixel blocks can be reduced. That is, as a polarization pixel with a direction orthogonal to one of the two different polarization directions is provided in a polarization information generation pixel block, a sensitivity difference detection pixel block can be generated.

Figure 4A:
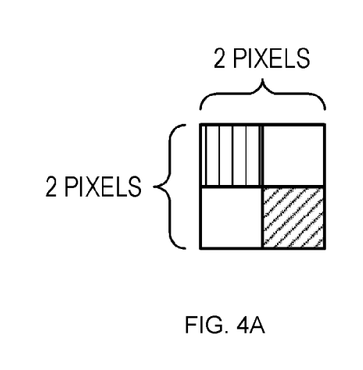
FIGS. 4A and 4B are diagrams showing example configurations of a polarization information generation pixel block and a sensitivity difference detection pixel block.
Figure 4B:
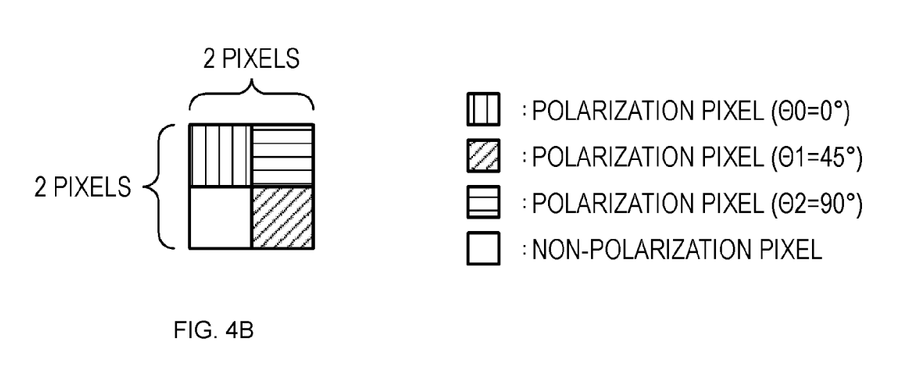

FIGS. 4A and 4B shows example configurations of a polarization information generation pixel block and a sensitivity difference detection pixel block. FIG. 4A shows an example of a polarization information generation pixel block, and FIG. 4b shows an example of a sensitivity difference detection pixel block. The drawings show a case where the polarization information generation pixel block and the sensitivity difference detection pixel block are 2×2 pixel regions, for example, the polarization information generation pixel block includes two non-polarization pixels and polarization pixels with two different polarization directions (polarization directions "θ0=0°, and θ1=45°", for example), and the sensitivity difference detection pixel block includes one non-polarization pixel and polarization pixels with three polarization directions (polarization directions "θ0=0°, θ1=45°, and θ2=90°", for example). Note that, in the polarization information generation pixel block, pixels at diagonal positions in the 2×2 pixel region are the non-polarization pixels. Note that the configuration of the polarization information generation pixel block is only required to include polarization pixels with two different polarization directions and non-polarization pixels, and the configuration of the sensitivity difference detection pixel block is only required to include polarization pixels with a plurality of polarization directions including a different polarization direction from those of the polarization information generation pixel block, and both blocks do not necessarily have the configurations shown in FIGS. 4A and 4B.

FIGS. 5A,5B, 5C, and 5D show example layouts of sensitivity difference detection pixel blocks. Note that, in FIGS. 5A, 5B, 5C, and 5D, the regions excluding the sensitivity difference detection pixel blocks are polarization information generation pixel blocks.

Figure 5A:
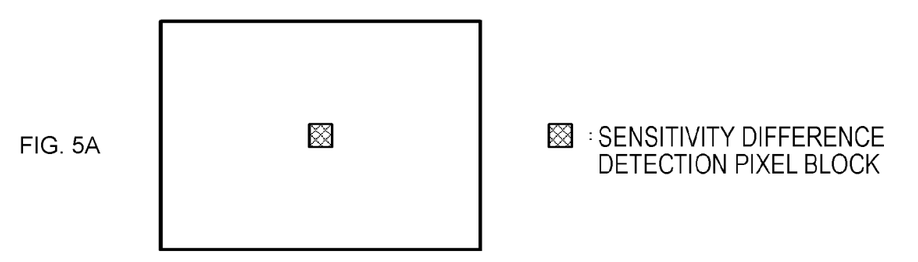
FIGS. 5A, 5B, 5C, and 5D are diagrams showing example layouts of sensitivity difference detection pixel blocks.

FIG. 5A shows an example case where one sensitivity difference detection pixel block is provided. In a case where the incident directions of light in the respective pixels are substantially equal, and the characteristics of the polarizers of the respective polarization pixels are substantially equal, the correction coefficient K for correcting the sensitivity difference between polarization pixels and non-polarization pixels has a substantially equal value, regardless of the pixel positions. Therefore, one sensitivity difference detection pixel block for calculating the correction coefficient K is provided.

Figure 5B:
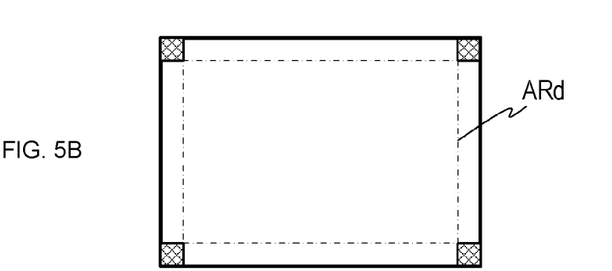

FIG. B5 shows an example case where sensitivity difference detection pixel blocks are provided outside the polarization information target region ARd for generating polarization information. Since any sensitivity difference detection pixel block is not provided in the polarization information target region ARd, decrease in the light quantity in the polarization information target region ARd can be reduced.

Figure 5C:
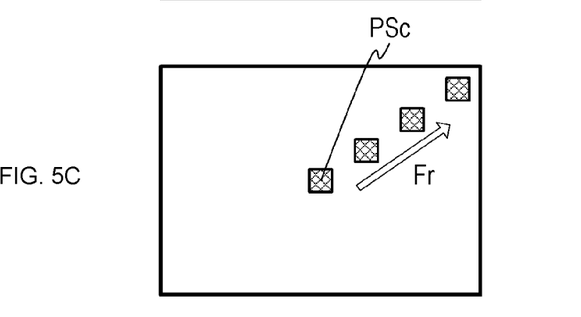

FIG. 5C shows an example case where a plurality of sensitivity difference detection pixel blocks is provided in a radial direction Fr from the position PSc corresponding to the optical axis of the imaging lens that is used in the imaging apparatus 10. For example, in a case where the focal length of the imaging lens is long, the angle of view is small, and the incident angle range of object light is narrow. However, if the focal length of the imaging lens becomes shorter, the angle of view becomes greater, and the incident angle range of object light becomes wider. For this reason, there is a possibility that a sensitivity difference is caused between a polarization pixel and a non-polarization pixel at the position corresponding to the optical axis and a position radially away from this position. Therefore, a plurality of sensitivity difference detection pixel blocks is provided in a radial direction from the position corresponding to the optical axis, so that the correction coefficient depending on a difference in sensitivity difference can be calculated, even if a difference in sensitivity difference is caused between the position corresponding to the optical axis and a position radially away from this position.

Figure 5D:
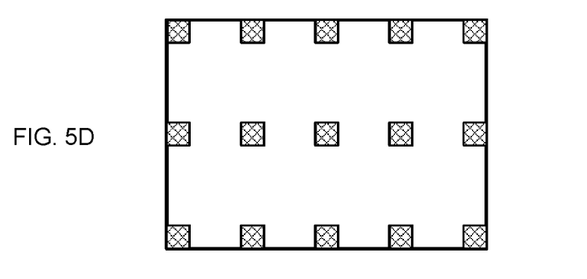

FIG. 5D shows an example case where a plurality of sensitivity difference detection pixel blocks is provided at predetermined intervals. As a plurality of sensitivity difference detection pixel blocks is provided at predetermined intervals, an interpolation process can be performed with a correction coefficient calculated for each sensitivity difference detection pixel block, and a correction coefficient depending on each pixel position can be calculated even in a case where the sensitivity difference between a polarization pixel and a non-polarization pixel varies with pixel positions due to the lens characteristics of the imaging lens or the like, for example.

The imaging apparatus 10 may also include a defective pixel correction unit that corrects a defective pixel in response to an image signal generated by the imaging unit 11, a noise removal unit that removes noise from an image signal as described in Patent Document 2, or the like.

<2-2. Image Processing Apparatus>

<2-2-1. Configuration of an Image Processing Apparatus>

Figure 6:
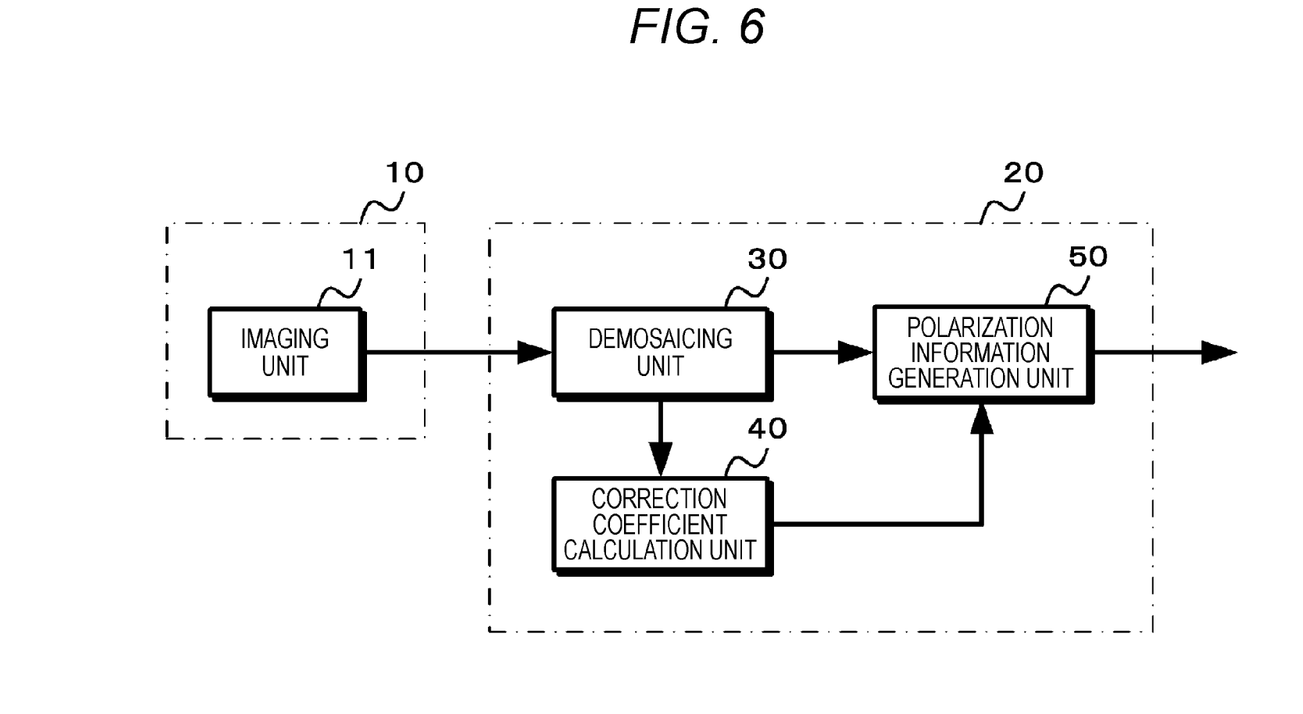
FIG. 6 is a diagram showing an example configuration of an image processing apparatus.

FIG. 6 shows an example configuration of an image processing apparatus. An image processing apparatus 20 calculates a correction coefficient of a sensitivity difference between a non-polarization pixel and a polarization pixel, and generates polarization information about the object included in a captured image, on the basis of an image signal generated by the imaging apparatus 10, or an image signal of the captured image acquired by the imaging unit 11 in which polarization information generation pixel blocks each including polarization pixels with two different polarization directions and non-polarization pixels, and sensitivity difference detection pixel blocks each including polarization pixels with a plurality of polarization directions including a different polarization direction from the polarization information generation pixel blocks are provided in the pixel region.

The image processing apparatus 20 includes a demosaicing unit 30, a correction coefficient calculation unit 40, and a polarization information generation unit 50.

The demosaicing unit 30 performs demosaicing using an image signal generated by the imaging apparatus 10, for example, and generates polarization component images for the respective polarization directions and a non-polarization image. In a case where the pixel layout in the imaging apparatus 10 is such that the pixels at two diagonal positions in a 2×2 pixel region are non-polarization pixels, and the remaining pixels are polarization pixels having different polarization directions as in the polarization information generation pixel block shown in FIG. 4A, the pixel array corresponds to the Bayer array. That is, a non-polarization pixel corresponds to a green pixel in the Bayer array, a polarization pixel with a polarization direction "α0=0°" corresponds to a red pixel (or a blue pixel) in the Bayer array, and a polarization pixel with a polarization direction "α1=45°" corresponds to a blue pixel (or a red pixel) in the Bayer array. Further, if the observation value of a non-polarization pixel is used as the observation value of a polarization pixel with a polarization direction "α2=90°" in a sensitivity difference detection pixel block, the sensitivity difference detection pixel block has a pixel layout that is equal to a polarization information generation pixel block. Therefore, the demosaicing unit 30 performs a process of generating image signals of the respective colors from the red pixels, the blue pixels, and the green pixels in the Bayer array, such as a process similar to the process disclosed in the literature "B. Gunturk, J. Glotzbach, Y. Altunbasak, R. Schafer, and R. Mersereau, "Demosaicing: Color filter array interpolation" in IEEE Signal Processing Magazine, vol. 22, no. 1, January 2005", for example, and generates image signals of polarization component images for the respective polarization directions (θ0=0°, and θ1=45°) and a non-polarization image. Note that, in a case where the pixel array is different from the Bayer array, image signals of polarization component images for the respective polarization directions and a non-polarization image are only required to be generated by a method similar to that disclosed in Patent Document 2.

The demosaicing unit 30 outputs the generated image signals of polarization component images for the respective polarization directions and a non-polarization image, to the polarization information generation unit 50. The demosaicing unit 30 also outputs, to the correction coefficient calculation unit 40, a pixel signal with a different polarization direction from those of the polarization information generation pixel blocks in the sensitivity difference detection pixel block, and image signals of polarization component images for the respective polarization directions and a non-polarization image. The demosaicing unit 30 may further output the pixel signals of the sensitivity difference detection pixel block to the correction coefficient calculation unit 40.

The correction coefficient calculation unit 40 calculates a correction coefficient of a sensitivity difference between a non-polarization pixel and a polarization pixel, on the basis of polarization pixels with two or more different polarization directions and non-polarization pixels in a captured image including the polarization pixels with a plurality of polarization directions and the non-polarization pixels. For example, the correction coefficient calculation unit 40 calculates a correction coefficient, using the pixel signal with a different polarization direction from those of the polarization information generation pixel blocks and the image signals of polarization component images for the respective polarization directions and a non-polarization image, the pixel signal and the image signals having been supplied from the demosaicing unit 30.

Figure 7:
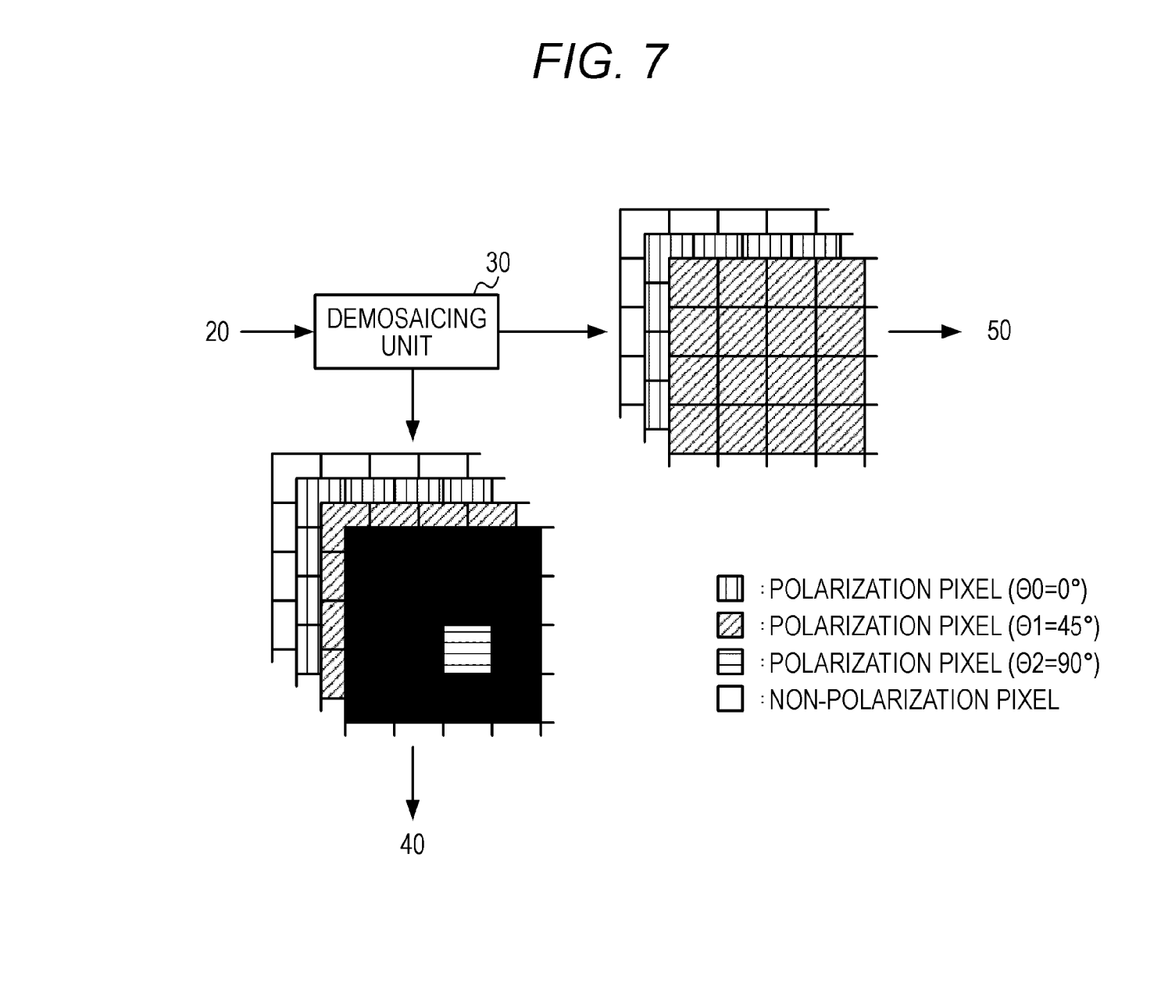
FIG. 7 is a diagram showing an example of images to be supplied to a correction coefficient calculation unit.

FIG. 7 shows an example of images to be supplied to the correction coefficient calculation unit. The correction coefficient calculation unit 40 calculates a function indicating the change in luminance I shown in FIG. 2, using the pixel signal with a different polarization direction from those of the polarization information generation pixel blocks and the image signals at the same pixel positions in polarization component images for the respective polarization directions and a non-polarization image, the pixel signal and the image signals having been supplied from the demosaicing unit 30. Further, an arithmetic operation according to Equation (6) is performed with the use of the maximum luminance Imax and the minimum luminance Imin of the calculated function and the pixel signal of the non-polarization pixels, so that the correction coefficient K is calculated.

Figure 8:
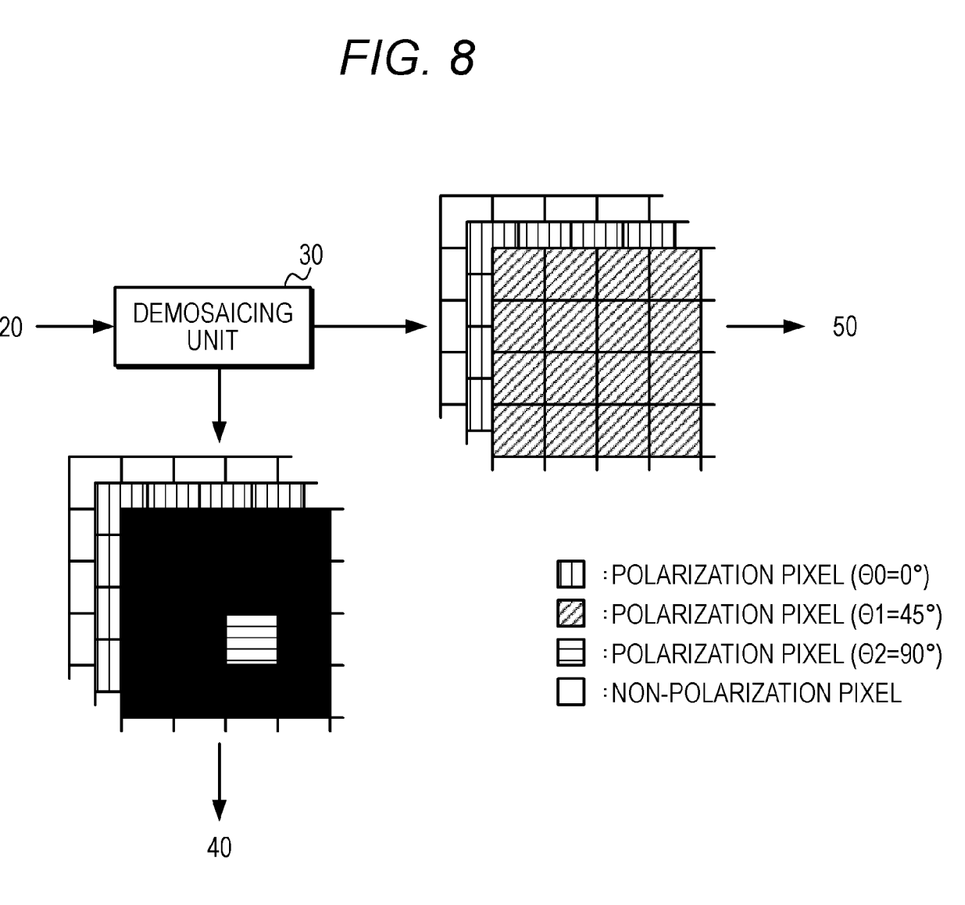
FIG. 8 is a diagram showing another example of images to be supplied to the correction coefficient calculation unit.

FIG. 8 shows another example of images to be supplied to the correction coefficient calculation unit. In a case where a sensitivity difference detection pixel block includes one non-polarization pixel and three polarization pixels with the polarization direction "θ0=0°, θ1=45°, and θ2=90°", the correction coefficient calculation unit 40 calculates the correction coefficient K by performing an arithmetic operation according to Equation (6) using the pixel value (observation value) I0 of the polarization pixel with the polarization direction θ0=0° and the pixel value (observation value) I90 of the polarization pixel with the polarization direction θ2=90°.

The correction coefficient calculation unit 40 outputs the calculated correction coefficient K as a correction coefficient for each pixel position to the polarization information generation unit 50. Further, in a case where the correction coefficient K is calculated for each of the plurality of sensitivity difference detection pixel blocks, the correction coefficient calculation unit 40 may perform an interpolation process using the calculated correction coefficient K for each of the plurality of sensitivity difference detection pixel blocks, calculate the correction coefficient K for each pixel position, and output the correction coefficient K to the polarization information generation unit 50.

As the correction coefficient calculation unit 40 can calculate the correction coefficient of the sensitivity difference between non-polarization pixels and polarization pixels on the basis of a captured image that has been obtained by the imaging unit 11 of the imaging apparatus 10 and includes non-polarization pixels and polarization pixels with a plurality of polarization directions as described above, there is no need to perform calibration in advance.

The polarization information generation unit 50 generates polarization information, using the polarization component image and the non-polarization image generated by the demosaicing unit 30, and the correction coefficient calculated by the correction coefficient calculation unit 40.

For example, Equation (1) described above can be expressed as Equation (7) using the polarization direction θ, and the polarization information generation unit 50 calculates the polarization parameters Wa, Wb, and Wc in Equation (7).

[Mathematical Formula 3]

$$I = Wa \cdot \sin(2 \cdot \theta) + Wb \cdot \cos(2 \cdot \theta) + Wc \tag{7}$$

The polarization information generation unit 50 calculates the polarization parameter Wc, using the luminance (pixel value) Ic of the non-polarization pixels, on the basis of Equation (8).

$$Wc = K \cdot Ic \tag{8}$$

The polarization information generation unit 50 also calculates the polarization parameters Wa and Wb in the polarization model expression shown in Equation (8) on the basis of the polarization pixels with two polarization directions and the non-polarization pixels, using the least squares method, for example. Here, the parameter x is defined as shown in Equation (9). Also, the polarization model A is defined as shown in Equation (10). Further, the luminance y is defined as shown in Equation (11). In a case where the parameter x, the polarization model A, and the luminance y are defined in this manner, y=Ax is ideally satisfied. Therefore, the parameter x is calculated by the least squares method on the basis of Equation (12).

[Mathematical Formula 4]

$$x = \begin{bmatrix} Wa \\ Wb \end{bmatrix} \tag{9}$$

$$A = \begin{bmatrix} \sin(2 \cdot \alpha_0) & \cos(2 \cdot \alpha_0) \\ \sin(2 \cdot \alpha_1) & \cos(2 \cdot \alpha_1) \end{bmatrix} \tag{10}$$

$$y = \begin{bmatrix} I_0 - K \cdot I_C \\ I_1 - K \cdot I_C \end{bmatrix} \tag{11}$$

$$x = (A^T A)^{-1} A^T y \tag{12}$$

Here, the polarization directions are "α0=0°, and α1=45°", for example, the polarization information generation target pixel in the polarization component image with the polarization direction α0 has the luminance (pixel value) I0, and the polarization information generation target pixel in the polarization component image with the polarization direction α1 has the luminance (pixel value) I1. In this case, the polarization parameter Wa and the polarization parameter Wb are values calculated according to Equation (13) and Equation (14), respectively. Note that the polarization parameter Wc is a value calculated according to Equation (8).

$$Wa = I1 - K \cdot Ic \tag{13}$$

$$Wb = I0 - K \cdot Ic \tag{14}$$

The polarization information generation unit 50 generates and outputs polarization information indicating the polarization parameters Wa, Wb, and Wc, or a polarization model expression using the polarization parameters Wa, Wb, and Wc. The polarization information generation unit 50 also stores the correction coefficient calculated by the correction coefficient calculation unit 40, and then generates polarization information, using the stored correction coefficient. In a case where a correction coefficient is newly calculated by the correction coefficient calculation unit 40, the polarization information generation unit 50 also updates the stored correction coefficient to the newly calculated correction coefficient.

<2-2-2. Operation of the Image Processing Apparatus>

Figure 9:
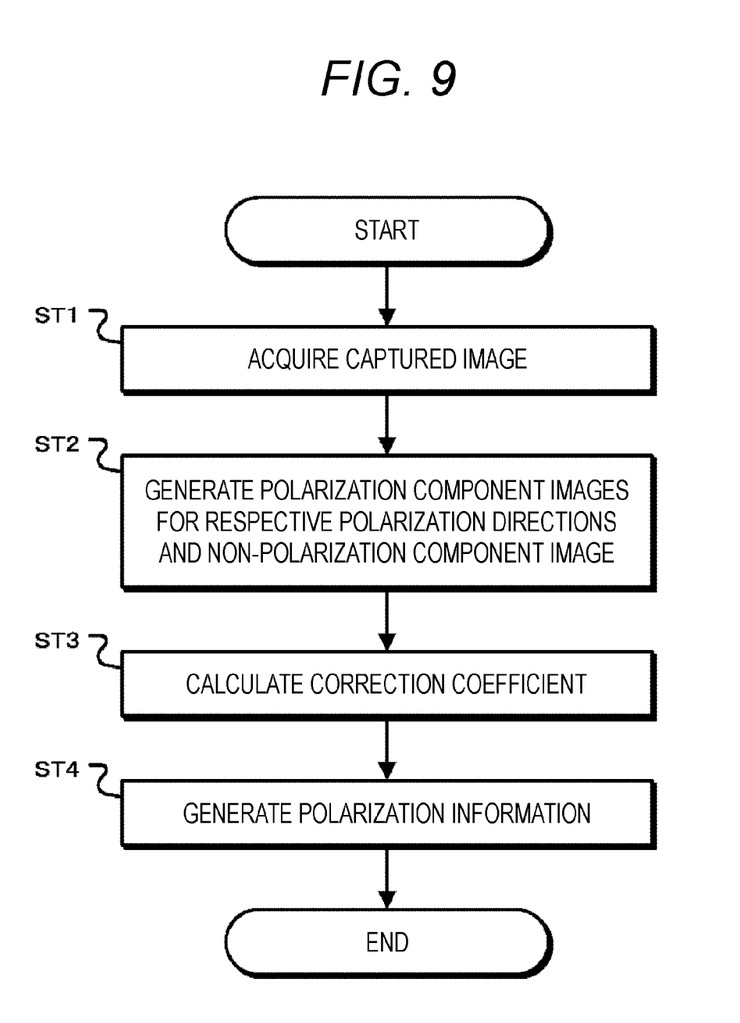
FIG. 9 is a flowchart showing an example operation of the image processing apparatus.

FIG. 9 is a flowchart showing an example operation of the image processing apparatus. In step ST1, the image processing apparatus acquires a captured image. The image processing apparatus 20 acquires, from the imaging apparatus 10, a captured image including polarization information generation pixel blocks each including non-polarization pixels and polarization pixels with two different polarization directions, and sensitivity difference detection pixel blocks each including a non-polarization pixel and polarization pixels with three different polarization directions, and then moves on to step ST2.

In step ST2, the image processing apparatus generates polarization component images for the respective polarization directions and a non-polarization image. The demosaicing unit 30 of the image processing apparatus performs demosaicing using the captured image, generates polarization component images that are polarization images for the respective polarization directions and a non-polarization image, and then moves on to step ST3.

In step ST3, the image processing apparatus calculates a correction coefficient. The correction coefficient calculation unit 40 of the image processing apparatus calculates a correction coefficient using the pixel values of the sensitivity difference detection pixel blocks, and then moves on to step ST4.

In step ST4, the image processing apparatus generates polarization information. The polarization information generation unit 50 of the image processing apparatus generates polarization information for each pixel, using the polarization component images and the non-polarization image generated in step ST2, and the correction coefficient calculated in step ST3.

Note that the demosaicing in step ST2 may be performed after or in parallel with the correction coefficient calculation in step ST3.

Further, the correction coefficient calculation in step ST3 may be performed at a predetermined timing or in a case where a change in the lens characteristics of the imaging lens or a change or the like greater than a predetermined value occurs in the imaging apparatus 10, for example. When imaging lenses are replaced, the incident characteristics of object light with respect to the polarization pixels might be changed by the lens replacement, resulting in a change in sensitivity. Therefore, in a case where imaging lenses are replaced, a correction coefficient is calculated, and the stored correction coefficient is updated, so that the sensitivity difference can be accurately corrected with the calculated correction coefficient, even without any calibration performed for each lens replacement. Further, in a case where the incident characteristics of the object light with respect to the polarization pixels changes depending on a zoom operation of the imaging lens, for example, a correction coefficient may be calculated for each focal length of the imaging lens and be stored into the polarization information generation unit 50.

As described above, the image processing apparatus can calculate a correction coefficient on the basis of the pixel values of sensitivity difference detection pixel blocks, using a captured image that has been generated by an imaging apparatus and includes polarization information generation pixel blocks each including the polarization pixels with two different polarization directions and non-polarization pixels, and the sensitivity difference detection pixel blocks each including polarization pixels with a plurality of polarization directions including a different polarization direction from those of the polarization information generation pixel blocks. Further, the image processing apparatus generates polarization information using a non-polarization image, polarization component images, and a correction coefficient. Thus, the image processing apparatus can generate polarization information with higher accuracy than in a case where any correction coefficient is not used. Furthermore, there is no need to calculate and store a correction coefficient by performing calibration in advance, and thus, the manufacturing process and the like can be simplified.

3. OTHER EMBODIMENTS

Figure 10:
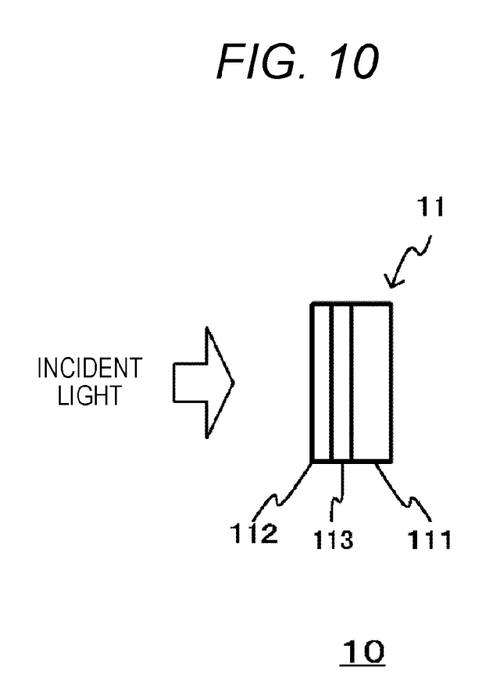
FIG. 10 is a diagram showing an example configuration of an imaging apparatus that generates color images.

Although the image processing apparatus described above is used in a case where a captured image generated by an imaging apparatus is a black-and-white image, the captured image may be a color image. FIG. 10 shows an example configuration of an imaging apparatus that generates color images. In a case where a color image is to be generated by the imaging apparatus 10, a color mosaic filter 113 is provided on the incident face of the image sensor 111 in the imaging unit 11. Note that the color mosaic filter 113 is not necessarily provided between the image sensor 111 and the polarization filter 112, but may be provided on the incident face of the polarization filter 112.

The polarization filter 112 and the color mosaic filter 113 include pixels of the same color in each polarization direction so as not to be affected by a difference in color between polarization pixels in different polarization directions. The polarization filter 112 and the color mosaic filter 113 are also designed to obtain the pixel value of a non-polarization pixel of each color. For example, the polarization information generation pixel blocks and the sensitivity difference detection pixel blocks are provided for the respective color components. Further, a correction coefficient is calculated with the sensitivity difference detection pixel block of the color having the highest non-polarization pixel value, so that a correction coefficient can be calculated on the basis of the other color components even at a pixel position at which the amount of one of the color components is small.

Furthermore, in the example case described in the above embodiment, a pixel signal with a different polarization direction from those of the polarization information generation pixel blocks in the sensitivity difference detection pixel blocks, and image signals of polarization component images for the respective polarization directions and a non-polarization image are output from the demosaicing unit 30 to the correction coefficient calculation unit 40 to calculate a correction coefficient. However, the pixel signals of the sensitivity difference detection pixel blocks may be supplied from the imaging apparatus 10 to the correction coefficient calculation unit 40 to calculate a correction coefficient.

Further, the imaging apparatus 10 and the image processing apparatus 20 may be integrally formed. Alternatively, the imaging apparatus 10 and the image processing apparatus 20 may be formed independently of each other, and image signals generated by the imaging apparatus 10 may be supplied to the image processing apparatus 20 via a wired or wireless transmission path, a recording medium, or the like.

4. EXAMPLE APPLICATIONS

The technology according to the present disclosure can be applied in various fields. For example, the technology according to the present disclosure may be embodied as a device mounted on any type of mobile structure, such as an automobile, an electrical vehicle, a hybrid electrical vehicle, a motorcycle, a bicycle, a personal mobility device, an airplane, a drone, a vessel, or a robot. Also, the technology according to the present disclosure may be realized as a device mounted on a machine that is used in a production process at a factory or on a machine that is used in construction fields. When the technology according to the present disclosure is applied in such fields, polarization information can be acquired with high accuracy, and accordingly, generation of normal line information, separation of reflection components, and the like can be performed with high accuracy. Thus, the surrounding environments can be easily grasped in three dimensions, and fatigue of the operator and the worker can be reduced. Further, automatic operation and the like can be performed more safely.

The technology according to the present disclosure can also be applied in medical fields. For example, when the technology according to the present disclosure is applied in a case where captured images of a surgical site are used during surgery, the three-dimensional shape of the surgical site and images thereof without reflection can be obtained with high accuracy, and it is possible to reduce fatigue of the surgeon and conduct surgery safely and more reliably.

Further, the technology according to the present disclosure can also be applied in fields such as public services. For example, when an image of an object is published in a book, a magazine, or the like, unnecessary reflection components and the like can be accurately removed from the image of the object. Also, when the technology according to the present disclosure is applied in surveillance fields, generation of normal line information, separation of reflection components, and the like can be performed with high accuracy, and thus, surveillance tasks can be easily performed.

The series of processes described in this specification can be performed by hardware, software, or a combination of hardware and software. In a case where processes are performed by software, a program in which the process sequences are recorded is installed in a memory incorporated into specialized hardware in a computer. Alternatively, the processes can be performed by installing the program into a general-purpose computer that can perform various kinds of processes.

For example, the program can be recorded beforehand in a recording medium, such as a hard disk, a solid state drive (SSD), or a read only memory (ROM). Alternatively, the program can be temporarily or permanently stored (recorded) in a removable recording medium, such as a flexible disk, a compact disc read only memory (CD-ROM), a magneto-optical (MO) disk, a digital versatile disc (DVD), a Blu-ray Disc (BD) (registered trademark), a magnetic disk, or a semiconductor memory card. Such a removable recording medium can be provided as so-called packaged software.

Also, the program may be installed into a computer from a removable recording medium, or may be transferred to a computer from a download site via a network such as a local area network (LAN) or the Internet in a wireless or wired manner. A computer receives the program transferred in such a manner, and installs the program into a recording medium such as an internal hard disk.

Note that the advantageous effects described in this specification are merely examples, and the advantageous effects of the present technology are not limited to them and may include additional effects that are not described herein. Further, the present technology should not be interpreted to be limited to the embodiments described above. The embodiments of this technology disclose the present technology through examples, and it should be obvious that those skilled in the art can modify or replace those embodiments with other embodiments without departing from the scope of the technology. That is, the claims should be taken into account in understanding the subject matter of the present technology.

An imaging apparatus of the present technology can also have the configurations described below.

(1) An imaging apparatus including an imaging unit that has a first pixel block and a second pixel block provided in a pixel region, the first pixel block including polarization pixels with two different polarization directions and a non-polarization pixel, the second pixel block including polarization pixels with a plurality of polarization directions including a different polarization direction from the first pixel block.

(2) The imaging apparatus according to (1), in which the second pixel block includes polarization pixels with three different polarization directions or polarization pixels with polarization directions orthogonal to one another, and a non-polarization pixel.

(3) The imaging apparatus according to (2), in which two polarization directions of the three different polarization directions and one polarization direction of the polarization directions orthogonal to one another are polarization directions equal to a polarization direction of a polarization pixel in the first pixel block.

(4) The imaging apparatus according to any one of (1) to (3), in which the number of the second pixel blocks is smaller than the number of the first pixel blocks.

(5) The imaging apparatus according to (4), in which the second pixel block is provided in a different region from a polarization information generation target region.

(6) The imaging apparatus according to (4), in which a plurality of the second pixel blocks is provided in a radial direction from a position corresponding to an optical axis position of an imaging lens.

(7) The imaging apparatus according to (4), in which a plurality of the second pixel blocks is provided at predetermined intervals.

An image processing apparatus of the present technology can also have the configurations described below.

(1) An image processing apparatus including a correction coefficient calculation unit that calculates a correction coefficient of a sensitivity difference between a non-polarization pixel and a polarization pixel, on the basis of polarization pixels with two or more different polarization directions and non-polarization pixels in a captured image including the polarization pixels with a plurality of polarization directions and the non-polarization pixels.

(2) The image processing apparatus according to (1), in which the captured image is a captured image generated by an imaging apparatus that has a first pixel block and a second pixel block, the first pixel block including polarization pixels with two different polarization directions and a non-polarization pixel, the second pixel block including polarization pixels with a plurality of polarization directions including a different polarization direction from the first pixel block.

(3) The image processing apparatus according to (2), in which the second pixel block includes polarization pixels with three different polarization directions, and the correction coefficient calculation unit calculates the correction coefficient on the basis of pixel values of the non-polarization pixel and the polarization pixels with the three different polarization directions.

(4) The image processing apparatus according to (2), in which the second pixel block includes polarization pixels with polarization directions orthogonal to one another, and the correction coefficient calculation unit calculates the correction coefficient on the basis of pixel values of the non-polarization pixel and the polarization pixels with the polarization directions orthogonal to one another.

(5) The image processing apparatus according to any one of (1) to (4), in which the correction coefficient calculation unit calculates the correction coefficient again at a predetermined timing.

(6) The image processing apparatus according to (5), in which the predetermined timing is timing at which imaging lenses are replaced in the imaging apparatus that generates the captured image.

(7) The image processing apparatus according to any one of (1) to (6), further including:

a demosaicing unit that generates a non-polarization image and a polarization component image for each polarization direction from the captured image; and a polarization information generation unit that generates polarization information indicating polarization characteristics of an object included in the captured image, on the basis of the polarization component image and the non-polarization image generated by the demosaicing unit, and the correction coefficient calculated by the correction coefficient calculation unit.

REFERENCE SIGNS LIST

10 Imaging apparatus
11 Imaging unit
20 Image processing apparatus
30 Demosaicing unit
40 Correction coefficient calculation unit
50 Polarization information generation unit
111 Image sensor
112 Polarization filter
113 Color mosaic filter

The invention claimed is:

1. An imaging apparatus, comprising:
   an imaging unit that has a first pixel block and a second pixel block provided in a pixel region, wherein
   the first pixel block including polarization pixels with two different polarization directions and a non-polarization pixel, the second pixel block incuding includes polarization pixels with three different polarization directions or polarization pixels with polarization directions orthogonal to one another, and a non-polarization pixel, and two polarization directions of the three different polarization directions and one polarization direction of the polarization directions orthogonal to one another are polarization directions equal to a polarization direction of a polarization pixel of the polarization pixels in the first pixel block.

2. The imaging apparatus according to claim 1, wherein a number of the second pixel blocks is smaller than a number of the first pixel blocks.

3. The imaging apparatus according to claim 2, wherein the second pixel block is in a region different from a polarization information generation target region.

4. The imaging apparatus according to claim 2, wherein a plurality of the second pixel blocks is in a radial direction from a position corresponding to an optical axis position of an imaging lens.

5. The imaging apparatus according to claim 2, wherein a plurality of the second pixel blocks is at specific intervals.

6. An image processing apparatus, comprising:
   central processing unit (CPU) configured to calculate a correction coefficient of a sensitivity difference between a non-polarization pixel and a polarization pixel, based on polarization pixels with at least two different polarization directions and non-polarization pixels in a captured image that includes the polarization pixels with a plurality of polarization directions and the non-polarization pixels.

7. The image processing apparatus according to claim 6, wherein
   the captured image is a captured image generated by an imaging unit that has a first pixel block and a second pixel block provided in a pixel region,
   the first pixel block includes polarization pixels with two different polarization directions and a non-polarization pixel,
   the second pixel block polarization pixels with a plurality of polarization directions including a different polarization direction from the first pixel block.

8. The image processing apparatus according to claim 7, wherein
   the second pixel block includes polarization pixels with three different polarization directions, and
   the CPU is further configured to calculate the correction coefficient based on a basis of pixel values of the non-polarization pixel and the polarization pixels with the three different polarization directions.

9. The image processing apparatus according to claim 7, wherein
   the second pixel block includes polarization pixels with polarization directions orthogonal to one another, and
   the CPU is further configured to calculate the correction coefficient based on pixel values of the non-polarization pixel and the polarization pixels with the polarization directions orthogonal to one another.

10. The image processing apparatus according to claim 6, wherein CPU is further configured to calculate the correction coefficient again at a specific timing.

11. The image processing apparatus according to claim 10, wherein the specific timing is timing at which imaging lenses are replaced in an imaging apparatus that generates the captured image.

12. An image processing apparatus according to claim 6, wherein:
    the CPU is further configured to:
    generate a non-polarization image and a polarization component image for each polarization direction from the captured image; and
    generate polarization information that indicates polarization characteristics of an object included in the captured image, based on the polarization component image and the non-polarization image, and the calculated correction coefficient.

13. An image processing method, comprising:
    calculating a correction coefficient of a sensitivity difference between a non-polarization pixel and a polarization pixel, based on polarization pixels with at least two different polarization directions and non-polarization pixels in a captured image including the polarization pixels with a plurality of polarization directions and the non-polarization pixels.

* * * * *